(12) United States Patent
Wu et al.

(10) Patent No.: US 10,136,115 B2
(45) Date of Patent: Nov. 20, 2018

(54) VIDEO SHOOTING METHOD AND APPARATUS

(71) Applicant: TENCENT TECHNOLOGY (SHENZHEN) COMPANY LIMITED, Shenzhen (CN)

(72) Inventors: Kai Wu, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 157 days.

(21) Appl. No.: 15/213,659

(22) Filed: Jul. 19, 2016

(65) Prior Publication Data

US 2016/0330423 A1 Nov. 10, 2016

Related U.S. Application Data

(63) Continuation of application No. PCT/CN2015/078870, filed on May 13, 2015.

(30) Foreign Application Priority Data

May 14, 2014 (CN) .......................... 2014 1 0201598

(51) Int. Cl.
*H04N 9/80* (2006.01)
*H04N 9/804* (2006.01)
(Continued)

(52) U.S. Cl.
CPC ......... *H04N 9/8042* (2013.01); *G11B 27/034* (2013.01); *H04N 5/77* (2013.01);
(Continued)

(58) Field of Classification Search
CPC ............ H04L 1/0045; H04N 21/4381; H03M 13/6306
(Continued)

(56) References Cited

U.S. PATENT DOCUMENTS 9,697,629 B1 * 7/2017 Vetter .................... G06T 11/60
2002/0001261 A1 * 1/2002 Matsui ................... G11B 20/10
369/30.07
(Continued)

FOREIGN PATENT DOCUMENTS

| CN | 102609302 A | 7/2012 |
| CN | 102789381 A | 11/2012 |
| CN | 103716691 A | 4/2014 |

OTHER PUBLICATIONS

The World Intellectual Property Organization (WIPO) International Search Report for PCT/CN2015/078870 dated Aug. 3, 2015 p. 1-3.
(Continued)

*Primary Examiner* — Nigar Chowdhury
(74) *Attorney, Agent, or Firm* — Anova Law Group, PLLC

(57) ABSTRACT

A video recording method and apparatus are disclosed. The method includes acquiring video data; buffering the video data at a native layer for which memory allocation is not limited; and performing encoding to obtain a video file according to the video data buffered at the native layer. Embodiments of the present disclosure solve the problem that a garbage collection (GC) mechanism is frequently triggered and the phenomenon of out of memory (OOM) occurs when image data is buffered at a Java layer, and achieve the effect that there is no need to trigger the GC mechanism and the phenomenon of OOM does not occur.

16 Claims, 4 Drawing Sheets

(51) Int. Cl.
*G11B 27/034* (2006.01)
*H04N 5/77* (2006.01)
*H04N 5/92* (2006.01)
*H04N 21/443* (2011.01)
*H04N 19/61* (2014.01)

(52) U.S. Cl.
CPC ............. *H04N 5/772* (2013.01); *H04N 19/61* (2014.11); *H04N 21/443* (2013.01)

(58) Field of Classification Search
USPC ........................................ 386/326–336, 248
See application file for complete search history.

(56) References Cited

U.S. PATENT DOCUMENTS

| | | | | |
|---|---|---|---|---|
| 2003/0011680 | A1* | 1/2003 | Tanaka | G11B 27/105 348/207.1 |
| 2003/0105604 | A1* | 6/2003 | Ash | H04L 41/5009 702/100 |
| 2004/0083264 | A1* | 4/2004 | Veselov | H04L 12/1822 709/204 |
| 2006/0069689 | A1* | 3/2006 | Karklins | G05B 19/05 |
| 2008/0131086 | A1* | 6/2008 | Hutten | G11B 27/034 386/329 |
| 2009/0033769 | A1 | 2/2009 | Nagaoka et al. | |
| 2011/0077819 | A1* | 3/2011 | Sakaguchi | G07C 5/0858 701/33.4 |
| 2011/0113350 | A1* | 5/2011 | Carlos | G06F 21/10 715/753 |
| 2011/0154377 | A1* | 6/2011 | Upton | G06F 9/45533 719/328 |
| 2012/0194691 | A1* | 8/2012 | Yasutomi | H04N 5/772 348/220.1 |
| 2012/0249853 | A1* | 10/2012 | Krolczyk | H04N 1/00448 348/333.01 |
| 2013/0236156 | A1* | 9/2013 | Ueda | G11B 27/034 386/230 |
| 2014/0181089 | A1* | 6/2014 | Desmond | G06F 17/30268 707/722 |
| 2015/0011196 | A1* | 1/2015 | Jayakumar | H04W 4/029 455/418 |

OTHER PUBLICATIONS

The State Intellectual Property Office of the People's Republic of China (SIPO) Office Action 1 for 201410201598.0 dated Sep. 30, 2017 7 Pages (including translation).

* cited by examiner

VIDEO SHOOTING METHOD AND APPARATUS

CROSS-REFERENCES TO RELATED APPLICATIONS

This application is a continuation application of PCT Patent Application No. PCT/CN2015/078870, filed on May 13, 2015, which claims priority to Chinese Patent Application No. 201410201598.0, entitled "VIDEO RECORDING METHOD AND APPARATUS" filed on May 14, 2014, the entire contents of both of which are incorporated herein by reference.

FIELD OF THE TECHNOLOGY

Embodiments of the present disclosure relate to the field of multimedia processing, and in particular, to a video recording method and apparatus.

BACKGROUND OF THE DISCLOSURE

Short video sharing is a very popular function on mobile terminals such as smart phones, tablet computers, and multimedia players at present. A user may record a short video of several seconds and share the short video with a friend by using a smart phone, so that the short video can convey information like a microblog.

A short video sharing application (App) on a mobile terminal using an Android system may call a related function interface built in the system to record a short video. For example, the short video sharing App calls a PreviewCallback interface built in the system, and each time a camera records a frame of preview image, the PreviewCallback interface automatically calls an onPreviewFrame callback function to return current image frame data to the short video sharing App. The short video sharing App buffers each frame of image frame data at a Java layer, and then encodes each frame of image frame data sequentially into a short video.

During the implementation of embodiments of the present disclosure, the inventor finds that the background at least has the following problems: each application, in the Android system, which belongs to the Java layer can only use limited memory of tens of MB, and when the image frame data is buffered at the Java layer, due to a large data amount of the image frame data, a garbage collection (GC) mechanism is frequently triggered when memory is insufficient for the Java layer, and even out of memory (OOM) occurs.

SUMMARY

According to a first aspect, a video recording method is provided, including acquiring video data; buffering the video data at a native layer for which memory allocation is not limited; and performing encoding to obtain a video file according to the video data buffered at the native layer.

According to a second aspect, a video recording apparatus is provided, including: a data collection module, configured to acquire video data; a data buffering module, configured to buffer the video data at a native layer for which memory allocation is not limited; and a data encoding module, configured to perform encoding to obtain a video file according to the video data buffered at the native layer.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objective, technical solutions, and advantages of the present disclosure clearer, the following further describes the embodiments of the present disclosure in detail with reference to the accompanying drawings.

Figure 1:
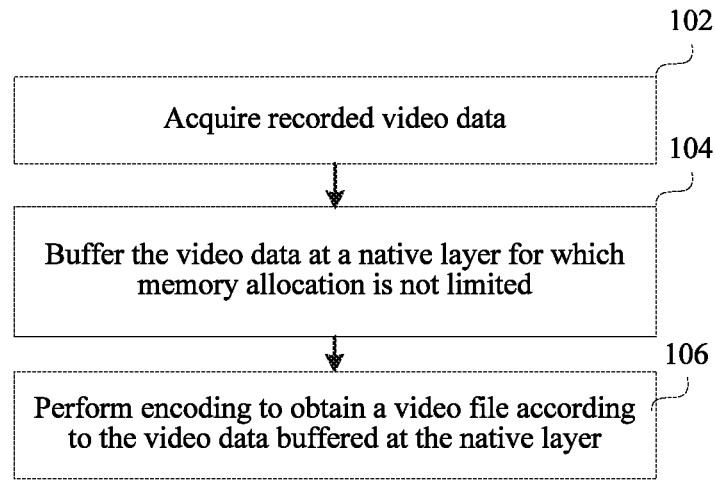
FIG. 1 is a method flowchart of a video recording method according to an embodiment of the present disclosure.

Refer to FIG. 1, which is a method flowchart of a video recording method according to an embodiment of the present disclosure. The video recording method is applied to an electronic device, and especially to an electronic device using an Android system. The video recording method includes:

Step 102: Acquire video data.

Step 104: Buffer the video data at a native layer for which memory allocation is not limited.

Step 106: Perform encoding to obtain a video file according to the video data buffered at the native layer.

To sum up, according to the video recording method provided by this embodiment, video data is acquired; the video data is buffered at a native layer for which memory allocation is not limited; and encoding is performed to obtain a video file according to the video data buffered at the native layer, thereby solving the problem that a GC mechanism is frequently triggered and the phenomenon of OOM occurs when image data is buffered at a Java layer, and achieving the effect that there is no need to trigger the GC mechanism and the phenomenon of OOM does not occur.

Figure 2:
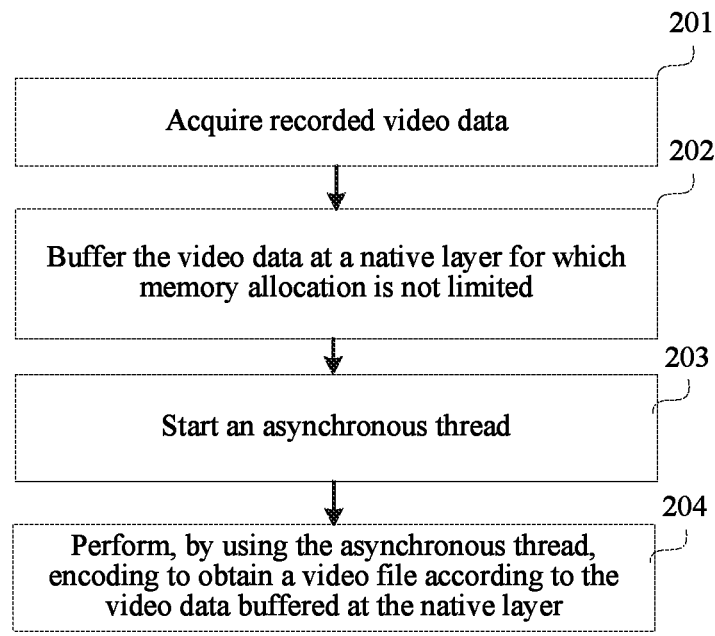
FIG. 2 is a method flowchart of a video recording method according to another embodiment of the present disclosure.

Refer to FIG. 2, which is a method flowchart of a video recording method according to another embodiment of the present disclosure. The video recording method is applied to an electronic device, and especially to an electronic device using an Android system. The video recording method includes:

Step 201: Acquire video data.

After receiving a start signal triggered by a user, the electronic device acquires video data. The video data generally includes image frame (frame) data and audio frame (sample) data. If a muted video is recorded, video data may include only image frame data, but, herein, an example in which the video data both includes image frame data and audio frame data is used for description.

A process of acquiring image frame data by the electronic device includes that: the electronic device calls a PreviewCallback interface provided by the Android system, and each time a camera records a frame of image frame data, the PreviewCallback interface automatically calls an onPreviewFrame callback function to return current image frame data.

A process of acquiring audio frame data by the electronic device includes that: the electronic device calls an AudioRecord interface provided by the Android system, and each time a microphone collects audio frame data, the AudioRecord interface automatically calls an onPreiodicNotification callback function to return current audio frame data.

In addition, after the electronic device receives the start signal, that is, recording starts, the electronic device further creates a video file (which is an empty file at this time) corresponding to this recording time period, and calls FFmpeg (a free, open source, and cross-platform audio and video streaming solution) to write a file header of the video file.

Step 202: Buffer the video data at a native layer for which memory allocation is not limited.

When acquiring the image frame data, the electronic device buffers the image frame data at the native layer for which memory allocation is not limited, where the native layer is a layer at which C codes are run, and theoretically, can use all available physical memory supported by the electronic device without limitation. Similarly, when acquiring the audio frame data, the electronic device also buffers the audio frame data at the native layer for which memory allocation is not limited. This step may include:

1. The electronic device buffers frame data of the video data at the native layer, the video data including a former or both of image frame data and audio frame data.

When acquiring a frame of image frame data or audio frame data, on one hand, the electronic device stores actual frame data of the image frame data or the audio frame data at the native layer, and on the other hand, the electronic device inserts related information of the image frame data or the audio frame data to a queue pre-created at a Java layer.

2. The electronic device buffers related information of the video data in a queue pre-created at a Java layer, the related information including a storage position, at the native layer, of each frame of data and a time corresponding to each frame of data.

The related information of the image frame data or the audio frame data may be not limited to a storage position at the native layer and a time; and in this embodiment, an example in which related information of a frame of data only includes a storage position, at the native layer, of the frame of data and a time corresponding to the frame of data is used for description. The storage position, at the native layer, of the frame of data may be indicated by a pointer, and the pointer points to memory space of the frame data at the native layer.

It should be noted that, the related information of the image frame data may be separately buffered in one queue, and the related information of the audio frame data may be separately buffered in another queue.

Step 203: Start an asynchronous thread.

In this embodiment, in addition to a thread used for buffering the image frame data and the audio frame data, the electronic device further separately starts an asynchronous thread to complete video encoding.

Step 204: Perform, by using the asynchronous thread, encoding to obtain a video file according to the video data buffered at the native layer.

The electronic device performs, by using the asynchronous thread, encoding to obtain the video file according to the video data buffered at the native layer. That is, the asynchronous thread continuously reads, from the queue, the image frame data and the audio frame data that are buffered at the native layer, and calls the FFmpeg to encode the read image frame data and audio frame data into the video file created in step 201.

In this embodiment, an example in which the video data includes only video data recorded in a same time period is used, and then, the electronic device reads each frame of data from the native layer and encodes each frame of data sequentially into a same video file according to the storage position, at the native layer, of each frame of data buffered in the queue and the time corresponding to each frame of data.

To sum up, according to the video recording method provided by this embodiment, video data is acquired; the video data is buffered at a native layer for which memory allocation is not limited; and encoding is performed to obtain a video file according to the video data buffered at the native layer, thereby solving the problem that a GC mechanism is frequently triggered and the phenomenon of OOM occurs when image data is buffered at a Java layer, and achieving the effect that there is no need to trigger the GC mechanism and the phenomenon of OOM does not occur.

On the other hand, a thread for buffering image frame data at a Java layer and a thread for performing video encoding in the background may generally be a same thread; and if an onPreviewFrame callback function is blocked, a frame rate of a video file obtained through encoding is lowered. However, according to the video recording method in this embodiment, an asynchronous thread is used to separately perform video encoding; therefore, the phenomenon of blocking does not occur, so that the frame rate of the video file obtained through encoding can be improved.

When recording a video, a user may use breakpoint recording. For example, if the user wants to record a short video with duration of 6 seconds, a finger of the user touches a record button displayed on the electronic device to start video recording; when the finger of the user moves off the record button displayed on the electronic device, the video recording is paused; and when the finger of the user touches again the record button displayed on the electronic device, the video recording continues, until the short video with the duration of 6 seconds is recorded. To implement the breakpoint recording, the following embodiment is provided.

Figure 3:
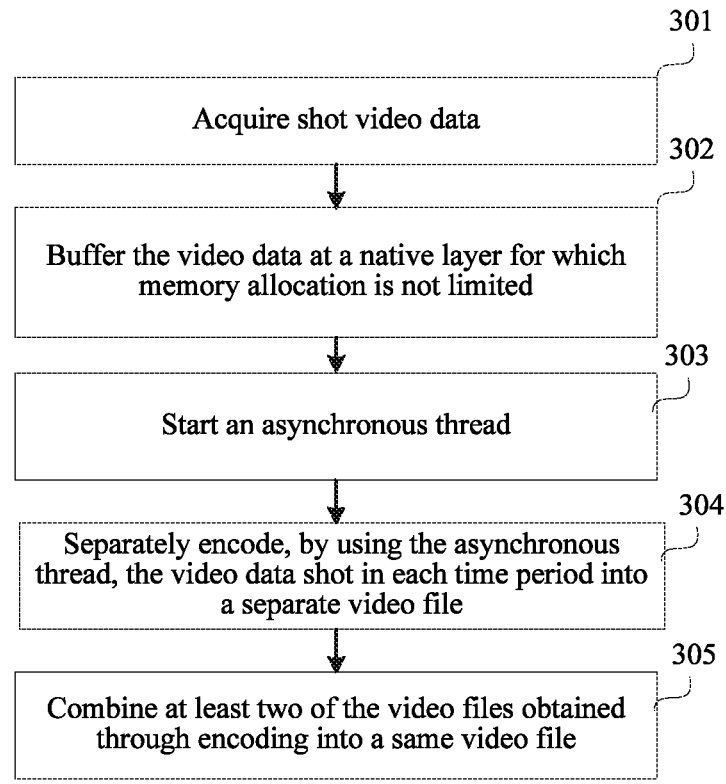
FIG. 3 is a method flowchart of a video recording method according to another embodiment of the present disclosure.

Refer to FIG. 3, which is a flowchart of a video recording method according to another embodiment of the present disclosure. The video recording method is applied to an electronic device, and especially to an electronic device using an Android system. The video recording method includes:

Step 301: Acquire video data.

After receiving a start signal triggered by a user, the electronic device acquires video data. The video data generally includes image frame (frame) data and audio frame (sample) data. If a muted video is recorded, video data may include only image frame data, but, herein, an example in which the video data both includes image frame data and audio frame data is used for description.

A process of acquiring image frame data by the electronic device includes that: the electronic device calls a PreviewCallback interface provided by the Android system, and each time a camera records a frame of image frame data, the PreviewCallback interface automatically calls an onPreviewFrame callback function to return current image frame data.

A process of acquiring audio frame data by the electronic device includes that: the electronic device calls an AudioRecord interface provided by the Android system, and each time a microphone collects audio frame data, the AudioRecord interface automatically calls an onPreiodicNotification callback function to return current audio frame data.

In addition, when starting recording in each time period, the electronic device creates a video file corresponding to a current time period. That is, when starting recording in each time period for breakpoint recording, the electronic device creates a video file (which is an empty file at this time) corresponding to the time period, and calls FFmpeg (a free, open source, and cross-platform audio and video streaming solution) to write a file header of the video file. For example, when recording in the first time period, the electronic device creates a video file 1, and when recording in the second time period, the electronic device creates a video file 2.

Step 302: Buffer the video data at a native layer for which memory allocation is not limited.

When acquiring the image frame data, the electronic device buffers the image frame data at the native layer for which memory allocation is not limited, where the native layer is a layer at which C codes are run, and theoretically, can use all available physical memory supported by the electronic device without limitation. Similarly, when acquiring the audio frame data, the electronic device also buffers the audio frame data at the native layer for which memory allocation is not limited. This step may include the following steps.

1. The electronic device buffers frame data of the video data at the native layer, the video data including a former or both of image frame data and audio frame data.

2. The electronic device buffers related information of the video data in a queue pre-created at a Java layer, the related information including a storage position, at the native layer, of each frame of data and a time corresponding to each frame of data.

Content of the related information may be not limited to a storage position and a time; and using the image frame data as an example, related information of each piece of image frame data may include: a storage position, at the native layer, of the image frame data, image format information of the image frame data, a data amount of the image frame data, a time corresponding to the image frame data, and a file name corresponding to the image frame data. The image format information of the image frame data, the data amount of the image frame data, and the file name corresponding to the image frame data are optionally included content.

The storage position, at the native layer, of the image frame data may be indicated by a pointer, and the pointer points to one piece of memory space at the native layer, where the memory space stores the image frame data.

In addition, because an image format of originally recorded image frame data may be different from an expected format in the final video file, when buffering related information of each frame of image frame data, the electronic device further buffers image format information of each frame of image frame data, where the image format information includes a width, a height, an angle, and the like of an image.

Further because a user may use a breakpoint recording manner, the electronic device further uses a video file name corresponding to each frame of data in the video data, as one piece of related information of the video data, and buffers the related information in the queue. Using the image frame data as an example, a file name corresponding to each piece of image frame data is determined according to a recording time period to which the image frame data belongs, image frame data recorded in different time periods corresponds to different file names, and image frame data recorded in a same time period corresponds to a same file name. For example, image frame data recorded in the first time period corresponds to the video file 1, and image frame data recorded in the second time period corresponds to the video file 2. Similarly, when buffering each frame of audio frame data, the electronic device further stores a video file name corresponding to the frame of audio frame data, for example, audio frame data recorded in the first time period corresponds to the video file 1, and audio frame data recorded in the second time period corresponds to the video file 2.

For example, using the image frame data s an example, the electronic device pre-creates a first in first out queue, where each element in the queue includes a corresponding file name, a pointer of frame data, a size of data of the frame data, a time, a width of the frame data, and a height of the frame data, and when the onPreviewFrame callback function acquires a frame of image frame data, related information of the image frame data is inserted to the pre-created queue, while actual frame data of the image frame data is buffered at the native layer.

It should be noted that, the related information of the image frame data may be separately buffered in one queue, and the related information of the audio frame data may be separately buffered in another queue.

Step 303: Start an asynchronous thread.

In this embodiment, in addition to a thread used for buffering the image frame data and the audio frame data, the electronic device further separately starts an asynchronous thread to complete video encoding.

Step 304: Separately encode, by using the asynchronous thread, the video data recorded in each time period into a separate video file.

If the video data includes video data recorded in different time periods, the electronic device separately encodes the video data recorded in each of the time periods into a separate video file. That is, the asynchronous thread continuously reads, according to related information of each frame of data in the queue, the image frame data and the audio frame data that are buffered at the native layer, and calls the FFmpeg to encode the read image frame data and audio frame data into the corresponding video file created in step 301.

In a process in which the electronic device separately encodes the video data recorded in each time period into the separate video file, the electronic device encodes each frame of data sequentially into a corresponding video file according to a video file name corresponding to each frame of data in the video data. That is, if the video file name corresponding to the buffered image frame data is the video file 1, the electronic device encodes the image frame data into the video file 1, and if the video file name corresponding to the buffered audio frame data is the video file 2, the electronic device encodes the audio frame data into the video file 2. A time in the related information is used to indicate an encoding order and a timestamp of each frame of data.

It should be further noted that, if the image format of the originally recorded image frame data is different from the expected format in the final video file, before encoding, the electronic device further performs affine transformation on each frame of image frame data into the expected format according to the image format information stored in step 302. That is, in step 302, when buffering the related information of each frame of image frame data in the queue, the electronic device also uses the image format information of each frame of image frame data as one piece of related information in advance and buffers the related information; therefore, before encoding, the electronic device may perform affine transformation on each frame of image frame data into the expected format according to the stored image format information.

Step 305: Combine at least two of the video files obtained through encoding into a same video file.

The electronic device combines at least two of the video files obtained through encoding into a same video file, and the same video file serves as a final video file.

To sum up, according to the video recording method provided by this embodiment, video data is acquired; the video data is buffered at a native layer for which memory allocation is not limited; and encoding is performed to obtain a video file according to the video data buffered at the native layer, thereby solving the problem that a GC mechanism is frequently triggered and the phenomenon of OOM occurs when image data is buffered at a Java layer, and achieving the effect that there is no need to trigger the GC mechanism and the phenomenon of OOM does not occur.

On the other hand, a thread for buffering image frame data at a Java layer and a thread for performing video encoding in the background generally are a same thread; and if an onPreviewFrame callback function is blocked, a frame rate of a video file obtained through encoding is lowered. However, according to the video recording method in this embodiment, an asynchronous thread is used to separately perform video encoding; therefore, the phenomenon of blocking does not occur, so that the frame rate of the video file obtained through encoding can be improved.

According to the video recording method provided by this embodiment, video file names respectively corresponding to the image frame data and audio frame data are further buffered when the video data is buffered, so that different frame data can be encoded into correct video files during encoding, thereby implementing a breakpoint recording function.

According to the video recording method provided by this embodiment, image format information corresponding to the image frame data is further buffered when related information of the image frame data is buffered, so that the effect of performing affine transformation on each frame of image frame data into an expected format according to the image format information before encoding can be achieved.

Figure 4:
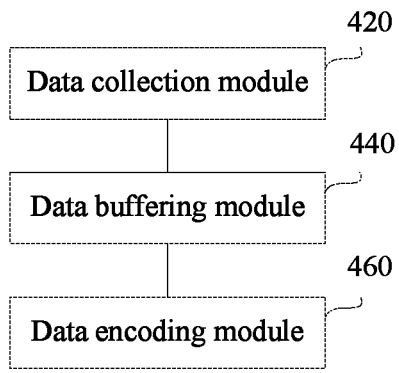
FIG. 4 is a schematic structural diagram of a video recording apparatus according to an embodiment of the present disclosure.

Refer to FIG. 4, which is a structural block diagram of a video recording apparatus according to an embodiment of the present disclosure. The video recording apparatus may be implemented as all or a part of an electronic device by software, hardware, or a combination of the two. The video recording apparatus includes a data collection module 420, a data buffering module 440, and a data encoding module 460.

The data collection module 420 is configured to acquire video data.

The data buffering module 440 is configured to buffer the video data at a native layer for which memory allocation is not limited.

The data encoding module 460 is configured to perform encoding to obtain a video file according to the video data buffered at the native layer.

To sum up, the video recording apparatus provided by this embodiment acquires video data; buffers the video data at a native layer for which memory allocation is not limited; and performs encoding to obtain a video file according to the video data buffered at the native layer, thereby solving the problem that a GC mechanism is frequently triggered and the phenomenon of OOM occurs when image data is buffered at a Java layer, and achieving the effect that there is no need to trigger the GC mechanism and the phenomenon of OOM does not occur.

Figure 5:
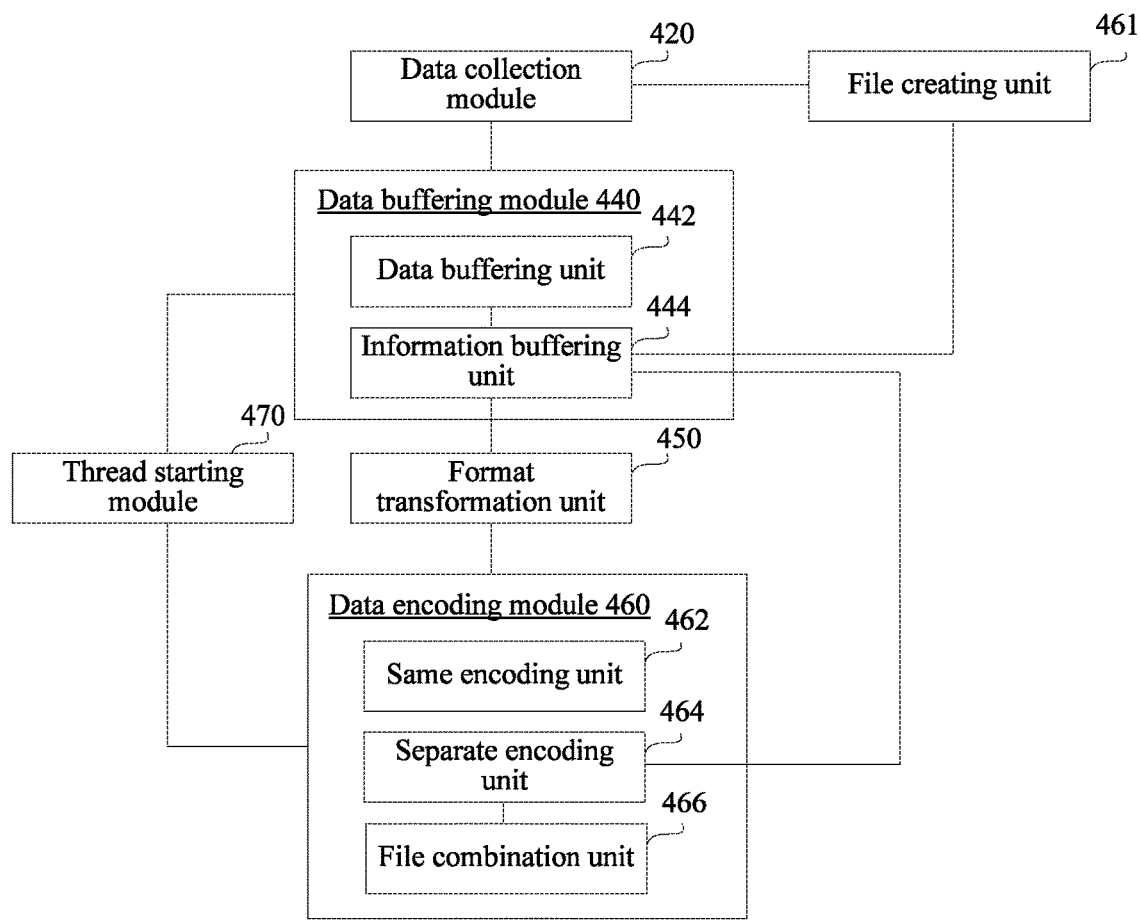
FIG. 5 is a schematic structural diagram of a video recording apparatus according to another embodiment of the present disclosure.

Refer to FIG. 5, which is a structural block diagram of a video recording apparatus according to an embodiment of the present disclosure. The video recording apparatus may be implemented as all or a part of an electronic device by software, hardware, or a combination of the two. The video recording apparatus includes a data collection module 420, a data buffering module 440, and a data encoding module 460.

The data collection module 420 is configured to acquire video data.

The data buffering module 440 is configured to buffer the video data at a native layer for which memory allocation is not limited.

The data encoding module 460 is configured to perform encoding to obtain a video file according to the video data buffered at the native layer.

The data buffering module 440 includes a data buffering unit 442, configured to buffer frame data of the video data at the native layer, the video data including a former or both of image frame data and audio frame data; and an information buffering unit 444, configured to buffer related information of the video data in a queue pre-created at a Java layer, the related information including a storage position, at the native layer, of each frame of data and a time corresponding to each frame of data.

The data encoding module 460 includes: a uniform encoding unit 462, configured to: if the video data includes video data recorded in a same time period, read each frame of data from the native layer and encode each frame of data sequentially into a same video file according to the storage position, at the native layer, of each frame of data buffered in the queue and the time corresponding to each frame of data.

The data encoding module 460 includes a separate encoding unit 464 and a file combination unit 466, where the separate encoding unit 464 is configured to separately encode, if the video data includes video data recorded in different time periods, the video data recorded in each of the time periods into a separate video file; and the file combination unit 466 is configured to combine at least two of the video files obtained through encoding into a same video file.

The apparatus further includes a file creating unit 461, where the file creating unit 461 is configured to create, when recording starts in each of the time periods, a video file corresponding to the time period; the information buffering unit 444 is further configured to use a video file name corresponding to each frame of data in the video data, as one piece of related information of the video data, and buffer the related information in the queue; and the separate encoding unit 464 is configured to encode each frame of data to a corresponding video file according to the video file name corresponding to each frame of data in the video data.

Optionally, the apparatus further includes a format transformation unit 450, where the information buffering unit 444 is further configured to also use image format information of each frame of image frame data as one piece of related information and buffer the related information when related information of each frame of image frame data is buffered in the queue; and the format transformation unit 450 is configured to perform affine transformation on each frame of image frame data into an expected format according to the image format information before encoding.

The apparatus further includes a thread starting module 470, where the thread starting module 470 is configured to start a asynchronous thread; and the data encoding module 460 is configured to perform, by using the asynchronous thread, the step of performing encoding to obtain a video file according to the video data buffered at the native layer.

To sum up, the video recording apparatus provided by this embodiment acquires video data; buffers the video data at a native layer for which memory allocation is not limited; and performs encoding to obtain a video file according to the video data buffered at the native layer, thereby solving the problem that a GC mechanism is frequently triggered and the phenomenon of OOM occurs when image data is buffered at a Java layer, and achieving the effect that there is no need to trigger the GC mechanism and the phenomenon of OOM does not occur.

On the other hand, a thread for buffering image frame data at a Java layer and a thread for performing video encoding in the background generally are a same thread; and if an onPreviewFrame callback function is blocked, a frame rate of a video file obtained through encoding is lowered. However, according to the video recording method in this embodiment, an asynchronous thread is used to separately perform video encoding; therefore, the phenomenon of blocking does not occur, so that the frame rate of the video file obtained through encoding can be improved.

The video recording apparatus provided by this embodiment further buffers video file names respectively corresponding to the image frame data and audio frame data when buffering the video data, so that different frame data can be encoded into correct video files during encoding, thereby implementing a breakpoint recording function.

The video recording apparatus provided by this embodiment further buffers image format information corresponding to the image frame data when buffering the image frame data, so that the effect of performing affine transformation on each frame of image frame data into an expected format according to the image format information before encoding can be achieved.

It should be noted that, the above functional modules are only described for exemplary purposes when the video recording apparatus provided by the foregoing embodiments records a video. In actual applications, the functions may be allocated to different functional modules according to specific needs, which means that the internal structure of the device is divided to different functional modules to complete all or some of the above functions. In addition, the video recording apparatus provided by the foregoing embodiments is based on the same concept as the video recording method in the foregoing embodiments. For the specific implementation process, refer to the method embodiments, and the details are not described herein again.

Figure 6:
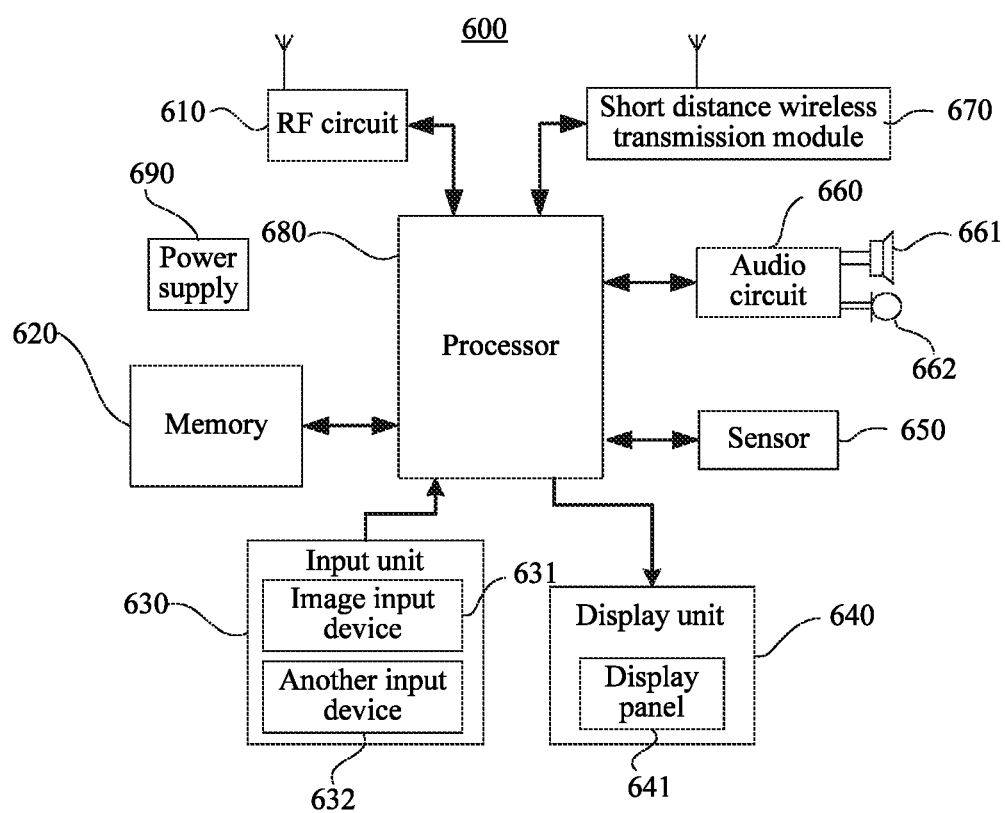
FIG. 6 is a schematic structural diagram of an electronic device according to an embodiment of the present disclosure.

Refer to FIG. 6, which is a schematic structural diagram of an electronic device according to an embodiment of the present disclosure. Specifically:

The electronic device 600 may include components such as a radio frequency (RF) circuit 610, a memory 620 including one or more computer readable storage media, an input unit 630, a display unit 640, a sensor 650, an audio circuit 660, a short distance wireless transmission module 670, a processor 680 including one or more processing cores, and a power supply 690. A person skilled in the art may understand that the structure of the electronic device shown in FIG. 6 does not constitute a limitation to the electronic device, and the electronic device may include more components or fewer components than those shown in the figure, or some components may be combined, or a different component deployment may be used.

The RF circuit 610 may be configured to receive and send signals during an information receiving and sending process or a call process. Particularly, the RF circuit 610 receives downlink information from a base station, then delivers the downlink information to one or more processors 680 for processing, and sends related uplink data to the base station. Generally, the RF circuit 610 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 610 may also communicate with a network and another device by wireless communication. The wireless communication may use any communications standard or protocol, which includes, but is not limited to, Global System for Mobile communications (GSM), general packet radio service (GPRS), Code Division Multiple Access (CDMA), Wideband Code Division Multiple Access (WCDMA), Long Term Evolution (LTE), e-mail, Short Messaging Service (SMS), and the like.

The memory 620 may be configured to store a software program and module. The processor 680 runs the software program and module stored in the memory 620, thereby implementing various function applications and data processing. The memory 620 may mainly include a program storage area and a data storage area. The program storage area may store an operating system, an application program required by at least one function (such as a sound playback function and an image display function), and the like. The data storage area may store data (such as audio data and an address book) created according to use of the electronic device 600, and the like. In addition, the memory 620 may include a high speed random access memory, and may also include a non-volatile memory, such as at least one magnetic disk storage device, a flash memory, or another volatile solid state storage device. Correspondingly, the memory 620 may further include a memory controller for the processor 680 and the input unit 630 to access the memory 620.

The input unit 630 may be configured to receive input digit or character information, and generate a keyboard, mouse, joystick, optical, or track ball signal input related to the user setting and function control. Specifically, the input unit 630 may include an image input device 631 and another input device 632. The image input device 631 may be a camera or may be a photoelectric scanning device. In addition to the image input device 631, the input unit 630 may further include the another input device 632. Specifically, the another input device 632 may include, but is not limited to, one or more of a physical keyboard, a functional key (such as a volume control key or a switch key), a track ball, a mouse, and a joystick.

The display unit 640 may be configured to display information input by the user or information provided for the user, and various graphical user interfaces of the electronic device 600. The graphical user interfaces may be formed by a graph, a text, an icon, a video, or any combination thereof. The display unit 640 may include a display panel 641. Optionally, the display panel 641 may be configured by using a liquid crystal display (LCD), an organic light-emitting diode (OLED), or the like.

The electronic device 600 may further include at least one sensor 650, such as an optical sensor, a motion sensor, and other sensors. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the electronic device 600 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the electronic device 600, are not further described herein.

The audio circuit 660, a loudspeaker 661, and a microphone 662 may provide audio interfaces between the user and the electronic device 600. The audio circuit 660 may convert received audio data into an electric signal and transmit the electric signal to the loudspeaker 661. The loudspeaker 661 converts the electric signal into a sound signal for output. On the other hand, the microphone 662 converts a collected sound signal into an electric signal. The audio circuit 660 receives the electric signal and converts the electric signal into audio data, and outputs the audio data to the processor 680 for processing. Then, the processor 680 sends the audio data to, for example, another electronic device by using the RF circuit 610, or outputs the audio data to the memory 620 for further processing. The audio circuit 660 may further include an earplug jack, so as to provide communication between a peripheral earphone and the electronic device 600.

The short distance wireless transmission module 670 may use the WiFi technology. The electronic device 600 may help, by using the short distance wireless transmission module 670, the user to receive and send e-mails, browse a webpage, access streaming media, and so on, which provides wireless broadband Internet access for the user. Although FIG. 6 shows the short distance wireless transmission module 670, it may be understood that, the short distance wireless transmission module 670 does not belong to a necessary constitution of the electronic device 600, and can be ignored according to demands without changing the scope of the essence of the present disclosure.

The processor 680 is the control center of the electronic device 600, and is connected to various parts of the electronic device by using various interfaces and lines. By running or executing the software program and/or module stored in the memory 620, and invoking data stored in the memory 620, the processor 680 performs various functions and data processing of the electronic device 600, thereby performing overall monitoring on the electronic device. Optionally, the processor 680 may include the one or more processing cores. Preferably, the processor 680 may integrate an application processor and a modem. The application processor mainly processes an operating system, a user interface, an application program, and the like. The modem mainly processes wireless communication. It may be understood that, the foregoing modem may be not integrated into the processor 680.

The electronic device 600 further includes the power supply 690 (such as a battery) for supplying power to the components. Preferably, the power supply may be logically connected to the processor 680 by using a power management system, thereby implementing functions, such as charging, discharging, and power consumption management, by using the power management system. The power supply 690 may further include one or more of a direct current or alternating current power supply, a re-charging system, a power failure detection circuit, a power supply converter or inverter, a power supply state indicator, and any other components.

Although not shown in the figure, the electronic device 600 may further include a Bluetooth module and the like, and details are not described herein again.

Specifically, in this embodiment, when the electronic device 600 is an electronic device for information providing, the electronic device for information providing further includes a memory and one or more programs. The one or more programs are stored in the memory and configured to be executed by one or more processors. The one or more programs include instructions for performing the following operations: acquiring video data; buffering the video data at a native layer for which memory allocation is not limited; and performing encoding to obtain a video file according to the video data buffered at the native layer.

Optionally, the buffering the video data at a native layer for which memory allocation is not limited includes buffering frame data of the video data at the native layer, the video data including a former or both of image frame data and audio frame data; and buffering related information of the video data in a queue pre-created at a Java layer, the related information including a storage position, at the native layer, of each frame of data and a time corresponding to each frame of data.

Optionally, the performing encoding to obtain a video file according to the video data buffered at the native layer includes: reading each frame of data from the native layer and encoding each frame of data sequentially into a same video file according to the storage position, at the native layer, of each frame of data buffered in the queue and the time corresponding to each frame of data, if the video data includes video data recorded in a same time period.

Optionally, the performing encoding to obtain a video file according to the video data buffered at the native layer includes: separately encoding, if the video data includes video data recorded in different time periods, the video data recorded in each of the time periods into a separate video file; and combining at least two of the video files obtained through encoding into a same video file.

Optionally, the method further includes: creating, when recording starts in each of the time periods, a video file corresponding to the time period. The buffering related information of the video data in a queue pre-created at a Java layer includes: using a video file name corresponding to each frame of data in the video data, as one piece of related information of the video data, and buffering the related information in the queue. The separately encoding the video data recorded in each of the time periods into a separate video file includes: encoding each frame of data to a corresponding video file according to the video file name corresponding to each frame of data in the video data buffered in the queue.

Optionally, the method further includes: also using image format information of each frame of image frame data as one piece of related information and buffering the related information when related information of each frame of image frame data is buffered in the queue; and performing affine transformation on each frame of image frame data into an expected format according to the image format information before encoding.

Optionally, the method further includes: starting an asynchronous thread; and performing, by using the asynchronous thread, the step of performing encoding to obtain a video file according to the video data buffered at the native layer.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A video recording method, comprising:
  acquiring video data; and
  buffering the video data at a native layer for which memory allocation is not limited, the video data comprising an image frame data and an audio frame data,
  wherein buffering the video data comprises:
  buffering the image frame data and the audio frame data of the video data at the native layer;
  buffering a first related information of the image frame data to a first queue pre-created at a Java layer, and buffering a second related information of the audio frame data to a second queue pre-created at the Java layer,
    wherein: the first related information comprises a storage position of the image frame data at the native layer, and a time corresponding to the image frame data;
    the second related information comprises a storage position of the audio frame data at the native layer, and a time corresponding to the audio frame data; and
    the first related information of the image frame data and the second related information of the audio frame data are separately buffered in different queues at the Java layer; and
  performing encoding to obtain a video file according to the video data buffered at the native layer.

2. The method according to claim 1, wherein the performing encoding to obtain a video file according to the video data buffered at the native layer comprises:
  reading the image frame data and the audio frame data from the native layer and encoding the image frame data and the audio frame data sequentially into a same video file according to the storage position of the image frame data at the native layer buffered in the first queue and the storage position of the audio frame data at the native layer buffered in the second queue, and the time corresponding to the image frame data and the audio frame data, if the video data comprises video data recorded in a same time period.

3. The method according to claim 1, wherein the performing encoding to obtain the video file according to the video data buffered at the native layer comprises:
  separately encoding, if the video data comprises video data recorded in different time periods, the video data recorded in each of the time periods into a separate video file; and
  combining at least two of the video files obtained through encoding into a same video file.

4. The method according to claim 3, further comprising:
  creating, when recording starts in each of the time periods, the video file corresponding to the time period, wherein the buffering the first related information of the image frame data to the first queue pre-created at the Java layer, and buffering the second related information of the audio frame data to the second queue pre-created at the Java layer comprises:
  using a video file name corresponding to the image frame data and the audio frame data in the video data, as one piece of the first related information and the second related information of the video data, buffering the first related information in the first queue, and buffering the second related information in the second queue; and
  the separately encoding the video data recorded in each of the time periods into a separate video file comprises:
  encoding the image frame data and the audio frame data to a corresponding video file according to the video file name corresponding to the image frame data and the audio frame data in the video data buffered in the first queue and the second queue.

5. The method according to claim 1, further comprising:
  using image format information of each frame of the image frame data as one piece of the first related information and buffering the first related information when the first related information of each frame of the image frame data is buffered in the first queue; and
  performing affine transformation on each frame of the image frame data into an expected format according to the image format information before encoding.

6. The method according to claim 1, further comprising:
  starting an asynchronous thread; and
  performing, by using the asynchronous thread, the step of performing encoding to obtain a video file according to the video data buffered at the native layer.

7. The method according to claim 6, wherein the asynchronous thread continuously reads the image frame data and the audio frame data buffered at the native layer based on the first related information buffered in the first queue and the second related information buffered in the second queue, and calls an encoding software to encode the read image frame data and the read audio frame data into the video file.

8. The method according to claim 1, wherein the memory allocation at the Java layer is limited, and the memory allocation at the native layer for buffering the video data is not limited.

9. A video recording apparatus, comprising:
  a memory; and
  a processor coupled to the memory, wherein the process is configured to:
  acquire video data; and
  buffer the video data at a native layer for which memory allocation is not limited, the video data comprising an image frame data and an audio frame data, wherein buffer the video data comprises:
  buffer the image frame data and the audio frame data of the video data at the native layer;
  buffer a first related information of the image frame data to a first queue pre-created at a Java layer, and buffer a second related information of the audio frame data to a second queue pre-created at the Java layer,
    wherein: the first related information comprises a storage position of the image frame data at the native layer, and a time corresponding to the image frame data;

the second related information comprises a storage position of the audio frame data at the native layer, and a time corresponding to the audio frame data; and the first related information of the image frame data and the second related information of the audio frame data are separately buffered in different queues at the Java layer; and perform encoding to obtain a video file according to the video data buffered at the native layer.

10. The apparatus according to claim 9, wherein the processor is further configured to:

if the video data comprises video data recorded in a same time period, read the image frame data and the audio frame data from the native layer and encode the image frame data and the audio frame data sequentially into a same video file according to the storage position of the image frame data at the native layer of buffered in the first queue and the storage position of the audio frame data at the native layer buffered in the second queue and the time corresponding to the image frame data and the audio frame data.

11. The apparatus according to claim 9, wherein the processor is further configured to:

separately encode, if the video data comprises video data recorded in different time periods, the video data recorded in each of the time periods into a separate video file; and combine at least two of the video files obtained through encoding into a same video file.

12. The apparatus according to claim 11, wherein the processor is further configured to:

create, when recording starts in each of the time periods, the video file corresponding to the time period;

use a video file name corresponding to the image frame data and the audio frame data in the video data, as one piece of the first related information and the second related information of the video data, buffer the first related information in the first queue, and buffer the second related information in the second queue; and encode the image frame data and the audio frame data to a corresponding video file according to the video file name corresponding to the image frame data and the audio frame data in the video data.

13. The apparatus according to claim 9, wherein the processor is further configured to:

use image format information of each frame of the image frame data as one piece of the first related information and buffer the first related information when the first related information of each frame of the image frame data is buffered in the first queue; and perform affine transformation on each frame of the image frame data into an expected format according to the image format information before encoding.

14. The apparatus according to claim 9, wherein the processor is further configured to:

start an asynchronous thread; and perform, by using the asynchronous thread, the step of performing encoding to obtain a video file according to the video data buffered at the native layer.

15. The apparatus according to claim 14, wherein the asynchronous thread continuously reads the image frame data and the audio frame data buffered at the native layer based on the first related information buffered in the first queue and the second related information buffered in the second queue, and calls an encoding software to encode the read image frame data and the read audio frame data into the video file.

16. The apparatus according to claim 9, wherein the memory allocation at the Java layer is limited, and the memory allocation at the native layer for buffering the video data is not limited.

* * * * *